US007860112B2

(12) United States Patent
Kompella

(10) Patent No.: US 7,860,112 B2
(45) Date of Patent: Dec. 28, 2010

(54) BI-DIRECTIONAL FORWARDING IN ETHERNET-BASED SERVICE DOMAINS OVER NETWORKS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 668 days.

(21) Appl. No.: 11/621,425

(22) Filed: Jan. 9, 2007

(65) Prior Publication Data

US 2007/0183419 A1 Aug. 9, 2007

Related U.S. Application Data

(60) Provisional application No. 60/771,086, filed on Feb. 7, 2006.

(51) Int. Cl.
*H04L 12/56* (2006.01)
(52) U.S. Cl. .................. 370/400; 370/389; 370/392; 370/401; 370/404
(58) Field of Classification Search .................. None
See application file for complete search history.

(56) References Cited

U.S. PATENT DOCUMENTS

| 7,260,097 | B2 * | 8/2007 | Casey ................ 370/392 |
| 2003/0108047 | A1 | 6/2003 | Mackiewich et al. |
| 2004/0264462 | A1 | 12/2004 | Bardalai et al. |
| 2005/0169270 | A1 | 8/2005 | Mutou et al. |
| 2005/0271036 | A1 * | 12/2005 | Cohen et al. ............ 370/351 |
| 2007/0025277 | A1 * | 2/2007 | Sajassi et al. ............ 370/256 |
| 2008/0195700 | A1 * | 8/2008 | Jonsson ................ 709/203 |

FOREIGN PATENT DOCUMENTS

EP 1 475 942 A2 11/2004

OTHER PUBLICATIONS

Response filed with European Patent Office on Sep. 25, 2008 for corresponding European Application No. 07 250 469.9, 24 pgs.
EPO Communication dated Oct. 23, 2008 for corresponding European Application No. 07 250 469.9, 7 pgs.
European Search Report dated Feb. 21, 2008, for corresponding European Application No. 07250469.9, 8 pgs.

(Continued)

*Primary Examiner*—Jayanti K Patel
*Assistant Examiner*—Anthony Sol
(74) *Attorney, Agent, or Firm*—Shumaker & Sieffert, P.A.

(57) ABSTRACT

Techniques are described for providing hybrid forwarding within an Ethernet-based service domain established over one or more intermediate networks, such as a service provider (SP) network. For example, the Ethernet-based service domain may comprise a virtual private local area network service (VPLS) domain. A hybrid VPLS domain may transport layer two (L2) communications, such as Ethernet packets, between remote customer networks via the SP network. The techniques described herein enable a network device, e.g., a router, within a SP network to forward packets from a source device of a hybrid VPLS domain toward one or more subscriber devices of the hybrid VPLS domain (i.e., in a downstream direction) using P2MP forwarding semantics. The same network device forwards packets from one of the subscriber devices toward the source device (i.e., in an upstream direction) using P2P forwarding semantics.

36 Claims, 4 Drawing Sheets

OTHER PUBLICATIONS

M. Wiget et al., "Dynamic VPLS solution over multicast enabled IP backbone," Internet Engineering Task Force (IETF), Internet Draft, XP002253327, Dec. 1999, 17 pgs.

L. Andersson et al., "Provider Provisioned Virtual Private Network (VPN) Terminology," Internet Engineering Task Force (IETF), Network Working Group, RFC 4026, XP015041973, Mar. 2005, 20 pgs.

First Office Action from Chinese Application No. 200710004904.1, dated Oct. 9, 2009 (10 pgs.).

Chinese Office Action from Chinese application No. 2007100049004.1, dated May 11, 2010, 5 pp.

Response to Chinese Office Action dated May 11, 2010, from Chinese application No. 200710004904.1, dated Jul. 9, 2010, 9 pp.

* cited by examiner

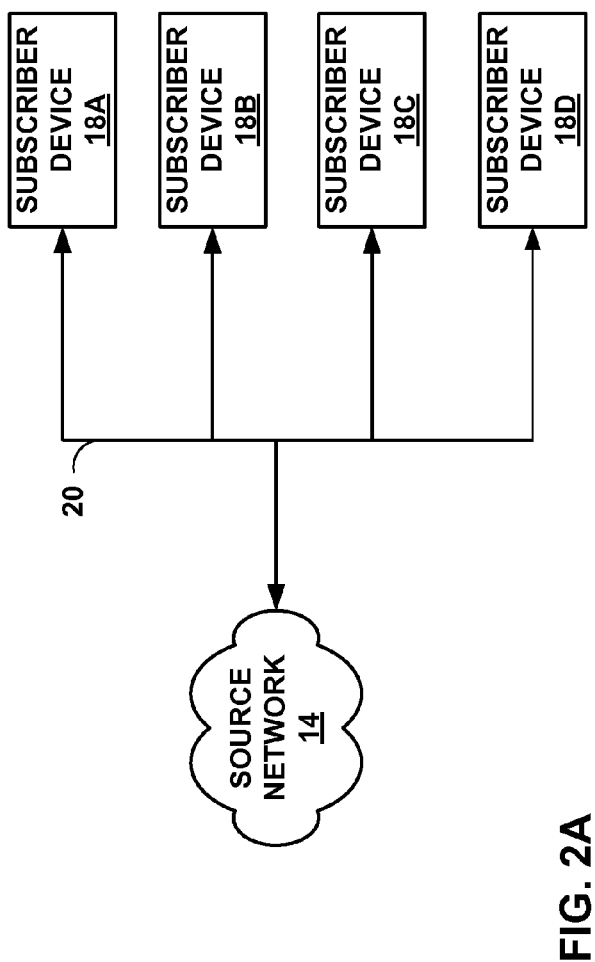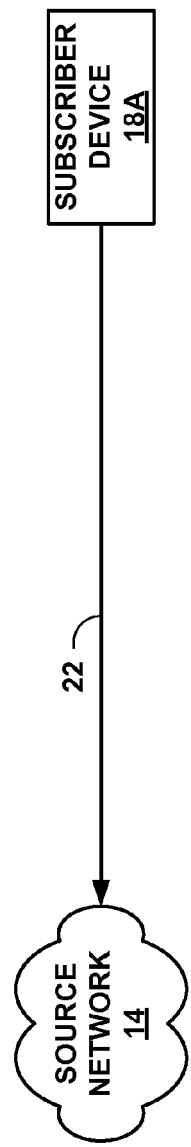
FIG. 2A
FIG. 2B

BI-DIRECTIONAL FORWARDING IN ETHERNET-BASED SERVICE DOMAINS OVER NETWORKS

This application claims the benefit of U.S. Provisional Application No. 60/771,086, filed Feb. 7, 2006, the entire content of which is incorporated herein by reference.

TECHNICAL FIELD

The invention relates to computer networks and, more particularly, to Ethernet-based service domains established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private local area network service (VPLS) domains are often used to extend two or more remote customer networks, i.e., VPLS sites, through a service provider (SP) network and possibly other intermediate networks, such as the Internet, as if the intermediate networks does not exist. VPLS domains provide point-to-multipoint (P2MP) connectivity, and may transport layer two (L2) communications, such as Ethernet packets, between customer networks via the SP network in a P2MP fashion. In a typical configuration, routers coupled to the customer networks define a full mesh of label switched paths (LSPs) within the SP network to carry encapsulated L2 communications as if these customer networks were directly attached to the same local area network (LAN).

In some cases, a VPLS domain may be configured to carry L2 multicast traffic, such as Internet Protocol Television (IPTV), desktop conferences, corporate broadcasts, music and video web casts, and other forms of multimedia content, to subscriber devices within the customer networks.

SUMMARY

In general, the invention relates to techniques for providing hybrid forwarding within an Ethernet-based service domain established over an intermediate network, such a service provider (SP) network. For example, the Ethernet-based service domain may comprise a virtual private local area network service (VPLS) domain. A hybrid Ethernet domain, in particular, a hybrid VPLS domain, may transport layer two (L2) communications, such as Ethernet packets, between remote customer networks via the SP network. The principles described herein enable hybrid VPLS domains to provide hub-and-spoke connectivity across the SP network.

For example, transmission of multicast content, such as Internet Protocol television (IPTV), may require point-to-multipoint (P2MP) connectivity in one direction and point-to-point (P2P) connectivity in the other direction in order to prevent subscriber devices of a VPLS domain from communicating with one another. The techniques described herein enable a network device, e.g., a router, within a SP network to forward packets from a source device of a hybrid VPLS domain toward one or more subscriber devices of the hybrid VPLS domain (i.e., in a downstream direction) using P2MP forwarding semantics. The same network device forwards packets from one of the subscriber devices toward the source device (i.e., in an upstream direction) using P2P forwarding semantics. For example, P2MP forwarding semantics may include Ethernet-based or VPLS forwarding semantics based on media access control (MAC) addresses within a LAN or a Virtual Local Area Network (VLAN), and P2P forwarding semantics may include forwarding semantics based solely on VLAN tags.

In addition, the network device may learn MAC addresses of downstream devices within the hybrid VPLS domain when receiving packets from the downstream devices. However, the network device need not learn MAC addresses of upstream devices within the hybrid VPLS domain. In this manner, the hybrid VPLS techniques provide security by preventing subscriber devices from communicating with other subscriber devices within the same hybrid VPLS domain, while allowing a source device within the hybrid VPLS domain to communicate with any of the subscriber devices.

In one embodiment, a method comprises forwarding packets from a network device of an Ethernet-based service domain established over a network to one or more downstream network devices of the Ethernet-based service domain using P2MP forwarding semantics. The method also comprises forwarding packets from the network device of the Ethernet-based service domain to an upstream network device using P2P forwarding semantics.

In another embodiment, a network device of an Ethernet-based service domain established over a network comprises a control unit that forwards packets to one or more downstream network devices of the Ethernet-based service domain using P2MP forwarding semantics. The control unit also forwards packets to an upstream network device of the Ethernet-based service domain using P2P forwarding semantics.

In another embodiment, a computer-readable medium comprises instructions that cause a processor to forward packets from a network device of an Ethernet-based service domain established over a network to one or more downstream network devices of the Ethernet-based service domain using P2MP forwarding semantics. The instructions also cause the processor to forward packets from the network device to an upstream network device of the Ethernet-based service domain using P2P forwarding semantics.

In a further embodiment, a method comprises forwarding packets from a network device of a network to one or more downstream network devices of the network using first forwarding semantics, and forwarding packets from the network device to an upstream network device of the network using second forwarding semantics.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2A is a block diagram illustrating a logical representation of the system of FIG. 1 from the perspective of a source network.

FIG. 2B is a block diagram illustrating a logical representation of the system of FIG. 1 from the perspective of a subscriber device.

DETAILED DESCRIPTION

Figure 1:
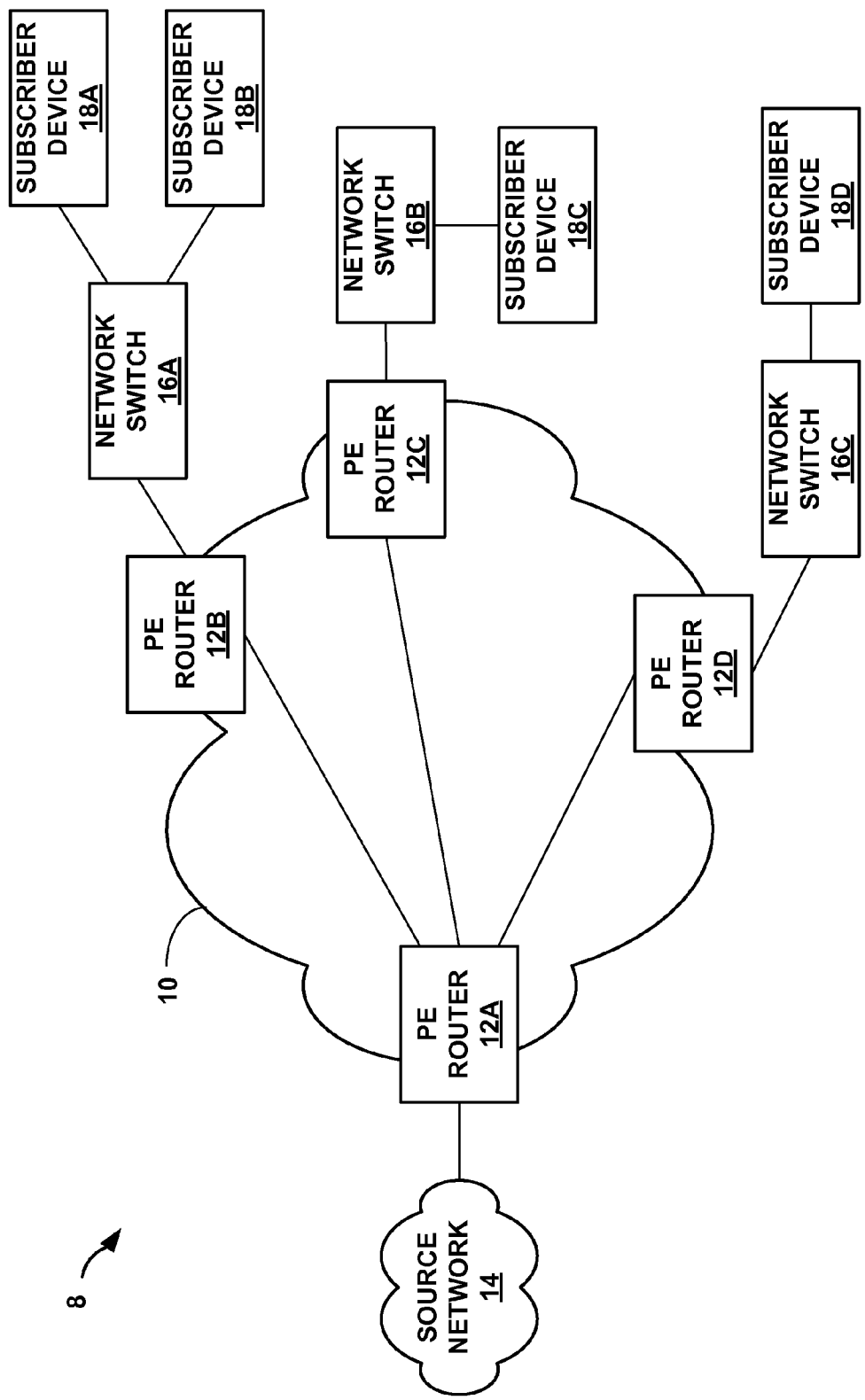
FIG. 1 is a block diagram illustrating an exemplary system having a service provider (SP) network in which provider edge (PE) routers support at least one Ethernet-based service domain, such as a virtual private local area network service (VPLS) domain.

FIG. 1 is a block diagram illustrating an exemplary system 8 having a service provider (SP) network 10 in which provider edge (PE) routers 12A-12D ("PE routers 12") support at least one hybrid Ethernet-based service domain, such as a virtual private local area network service (VPLS) domain. In the illustrated embodiment, an administrator of SP network 10 establishes a hybrid VPLS domain over SP network 10 between a source PE router 12A and destination PE routers 12B-12D to transport layer two (L2) communications, such as Ethernet packets, between PE routers 12. For example, the hybrid VPLS domain may transport L2 multicast traffic, such as Internet Protocol Television (IPTV), desktop conferences, corporate broadcasts, music and video web casts, and other forms of multimedia content, from source PE router 12A to destination PE routers 12B-12D for subscriber devices 18A-18D ("subscriber devices 18").

Subscriber devices 18 connect to PE routers 12B-12D via network switches 16A-16C ("network switches 16"). Each of subscriber devices 18 may be included within a different customer network (not shown) such as a local area network (LAN) or a wide area network (WAN). Subscriber devices 18 may be desktop computers, laptops, workstations, PDAs, wireless devices, network-ready appliances, file servers, print servers or other devices. Network switches 16 may be, for example, digital subscriber line access multiplexers (DSLAMs).

Each of subscriber devices 18 may request multicast traffic of the VPLS domain from source network 14 via PE routers 12B-12D. Source PE router 12A, in turn, receives the requested multicast traffic from a source network 14, which may comprise the Internet or another SP network. PE router 12A may be configured to support a Broadband Remote Access Server (BRAS) application to aggregate requests from destination PE routers 12B-12D into a higher-speed uplink to source network 14.

In some cases, SP network 10 may comprise a multiprotocol label switching (MPLS) network in which PE routers 12 are connected by a full mesh of label switch paths (LSPs). For exemplary purposes, the techniques are described herein in reference to VPLS and the transportation of Ethernet packets across SP network 10. In order to establish a hybrid VPLS domain for subscriber devices 18, PE routers 12 communicate to establish end-to-end LSPs through SP network 10. PE routers 12 may use any type of label switching protocol to establish the LSPs, such as MPLS protocols like Resource Reservation Protocol (RSVP) and the Label Distribution Protocol (LDP). Each of PE routers 12 may signal pseudo-wires over the LSPs to the other PE routers 12 within the hybrid VPLS domain to transport Ethernet packets between PE routers 12.

In the illustrated embodiment, a hybrid VPLS domain provides SP network 10 with hub-and-spoke connectivity between source PE router 12A and destination PE routers 12B-12D. PE routers 12 are configured to belong to at least one hybrid VPLS domain. Network devices, such as PE routers 12 and intermediate routers, within the hybrid VPLS domain are configured to transport both unicast and multicast traffic from source PE router 12A to destination PE routers 12B-12D in a point-to-multipoint (P2MP) fashion, while transporting traffic from PE routers 12B-12D to source PE router 12A in a point-to-point (P2P) fashion. In this manner, security and privacy may be improved for subscribers to SP network 10 as network switches 16 and subscriber devices 18 are prevented from communicating with one another.

The techniques described herein may reduce the state and the overhead of maintaining the state in SP network 10 by removing the need to perform Media Access Control (MAC) address learning in the direction from source PE router 12A to destination PE routers 12B-12D. Destination PE routers 12B-12D need not learn remote MAC addresses since MAC addresses are not needed for P2P forwarding that occurs in the upstream direction. Instead, packets forwarded from destination routers 12B-12D toward source PE router 12A may blindly follow the pseudo-wires signaled between PE routers 12 of the hybrid VPLS domain.

Source PE router 12A may use VPLS auto-discovery to learn the VPLS memberships of downstream PE routers 12B-12D within SP network 10. PE routers 12 may forward VPLS state data towards source network 14, such as MAC addresses for subscriber devices 18, VPLS domains to which subscriber devices 18 belong, information required to forward traffic to these devices, or other VPLS domain information. PE router 12A updates internal routing information and forwarding information associated with the VPLS domains based on the received VPLS state information.

Multicast content transmitted in the downstream direction, i.e., from source network 14 to subscriber devices 18, is forwarded using P2MP forwarding semantics. For example, P2MP forwarding semantics may include Ethernet-based or VPLS forwarding semantics. PE router 12A receives Ethernet communications from source network 14, and formulates packets for transportation to subscriber devices 18 in accordance with the hybrid VPLS domain. The Ethernet communications may be, for example, IPTV content. PE router 12A may encapsulate Ethernet communications in one or more MPLS packets and forward the MPLS packets to PE routers 12B-12D over SP network 10 via the pseudo-wire signaled over the LSPs between PE routers 12. In turn, PE routers 12B-12D extract the Ethernet communications from the MPLS packets, and forward the Ethernet communications to subscriber devices 18.

In particular, when destination PE router 12B receives a packet from source PE router 12A, PE router 12B looks up the MAC address of the packet in downstream forwarding information within PE router 12B. If PE router 12B knows the destination of the packet, PE router 12B will forward the packet to the appropriate one of subscriber devices 18A and 18B. If PE router 12B does not know the destination, PE router 12B uses VPLS to emulate MAC flooding, and forwards the packet to each of subscriber devices 18A and 18B that is a member of the particular VPLS domain.

Communications moving in the upstream direction, i.e., from destination PE routers 12B-12D to source PE router 12A, are forwarded using P2P forwarding semantics. For example, P2P forwarding semantics may include use of Virtual Local Area Network (VLAN) identifiers. Subscriber device 18B, for example, may request a specific IPTV channel from source network 14. Subscriber device 18B sends the request to network switch 16A, which forwards the request to PE router 12B. When PE router 12B receives a packet from network switch 16A, PE router 12B will forward the packet toward source network device 12A using P2P forwarding semantics. PE router 12B does not look at the MAC address of the packet, or perform MAC-type flooding, as in P2MP forwarding. Instead, PE router 12B looks at where the packet came from, e.g., the physical port or VLAN, such as by looking at a VLAN tag associated with the packet. Based on this information, PE router 12B outputs the packet on a P2P pseudo-wire signaled between PE router 12B and source PE router 12A. In this manner, the hybrid VPLS domain over SP network 10 provides hybrid forwarding techniques having P2MP connectivity in the downstream direction and P2P connectivity in the upstream direction. In one embodiment, the administrator of SP network 10 establishes the hybrid Ethernet-based service domain (e.g., the hybrid VPLS domain) to extend to network switches 16. For example, the administrator configures each of network switches 16 to forward packets to one or more downstream network devices (e.g., subscriber devices 18) using P2MP forwarding semantics, and forwarding packets to an upstream network device (e.g., one of PE routers 12) using P2P forwarding semantics.

FIG. 2A is a block diagram illustrating a logical representation of system 8 of FIG. 1 from the perspective of source network 14. As shown in the logical representation of FIG. 2A, source network 14 views system 8 as a full mesh VPLS network having any-to-any connectivity. To source network 14, all of remote subscriber devices 18 appear to be in the same Ethernet LAN 20 even though traffic is actually transmitted across SP network 10. Source network 14 may communicate in a P2MP manner with any of subscriber devices 18 using Ethernet-based or VPLS forwarding semantics.

FIG. 2B is a block diagram illustrating a logical representation of system 8 of FIG. 1 from the perspective of a subscriber device such as subscriber device 18A. As shown in the logical representation of FIG. 2B, subscriber device 18A views system 8 as a P2P connection, i.e., a pseudo-wire, 22 between itself and source network 14. Subscriber device 18A communicates in a P2P manner with source network 14 using VLAN forwarding semantics. Subscriber device 18A cannot communicate with other subscriber devices 18B-18D that belong to the same hybrid VPLS domain. The logical representations illustrated in FIGS. 2A-2B may correspondingly represent the perspective of subscriber device 18A with respect to PE router 12A, PE router 12B, or network switch 16A, instead of source network 14 as illustrated. For example, where network switch 16A implements the bidirectional forwarding mechanisms described herein, network switch 16A may communicate with subscribers 18A and 18B in a P2MP fashion, while subscriber device 18A communicates with network switch 16A in a P2P fashion using VLAN identifiers.

Figure 3:
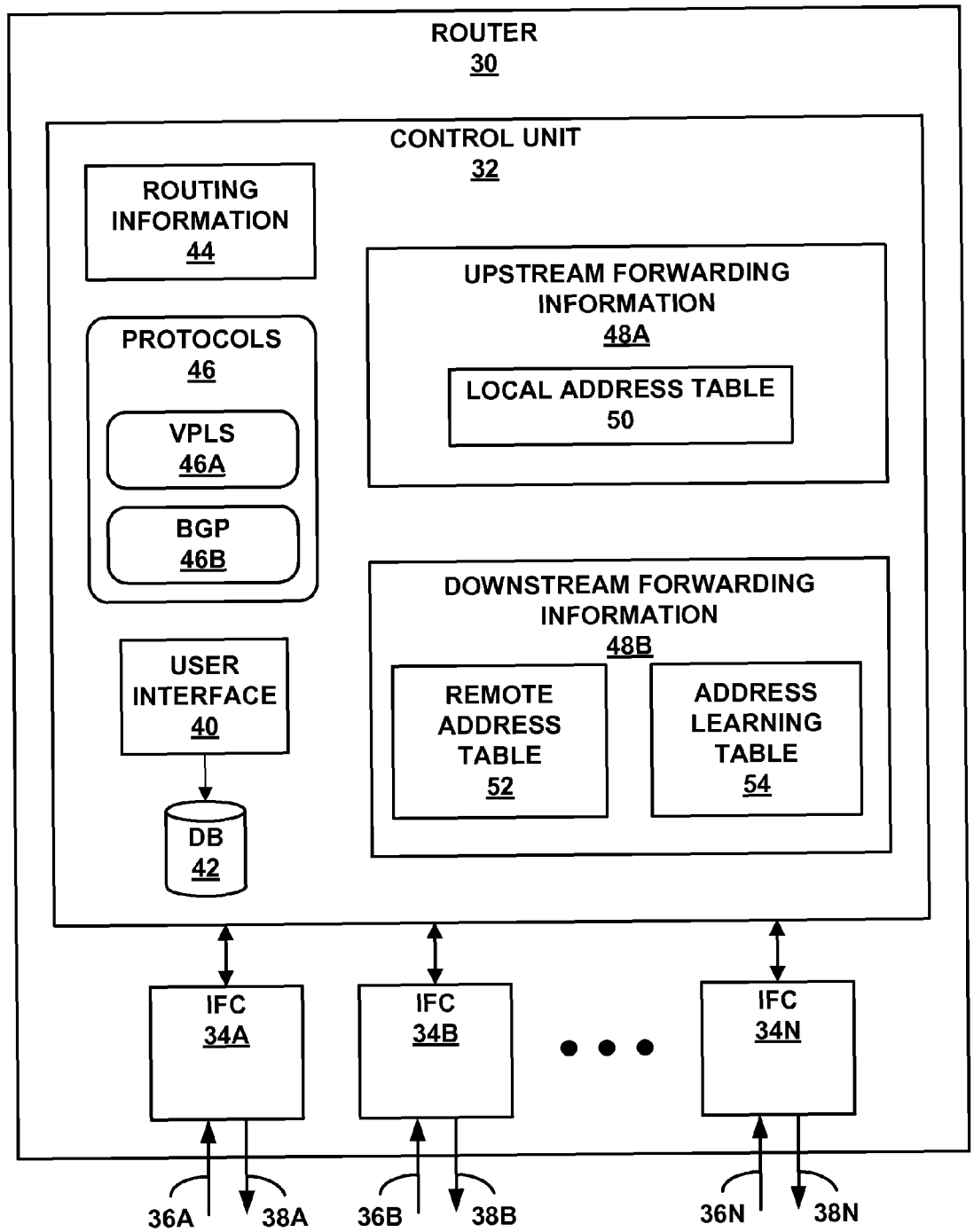
FIG. 3 is block diagram illustrating an exemplary router that supports bi-directional forwarding hybrid VPLS domains in accordance with the principles of the invention.

FIG. 3 is block diagram illustrating an exemplary router 30 that supports bi-directional forwarding hybrid VPLS domains in accordance with the principles of the invention. Router 30 may, for example, represent any of PE routers 12 from FIG. 1. As an example, router 30 may comprise a source network device, e.g., PE router 12A, a destination network device, e.g., one of PE routers 12B-12D, or an intermediate network device within a hybrid VPLS domain established over a SP network. Router 30 includes a control unit 32 that determines routes of received packets and forwards the packets accordingly. In the exemplary embodiment illustrated in FIG. 3, router 30 includes interface cards (IFCs) 34A-34N (collectively, "IFCs 34") for communicating packets via inbound links 36A-36N ("inbound links 36") and outbound links 38A-38N ("outbound links 38"). IFCs 34 are coupled to inbound links 36 and outbound links 38 via a number of interface ports (not shown).

A system administrator may send configuration information to router 30 via user interface 40 included within control unit 32. For example, the system administrator may configure router 30 to belong to one or more hybrid VPLS domains. The system administrator may also specify a set of interfaces as "upstream interfaces," i.e., interfaces on which traffic is received from the upstream direction, and another set of interfaces as "downstream interfaces," i.e., interfaces on which traffic is received from the downstream direction. The configured interfaces may be logical interfaces. The system administrator associates these sets of interfaces with different forwarding semantics. In particular, the system administrator may associate the upstream interfaces with P2MP forwarding semantics, and the downstream interfaces with P2P forwarding semantics. The configuration information may then be stored in database (DB) 42 coupled to user interface 40. User interface 40 may include a display, a keyboard, a mouse or another type of input device.

Control unit 32 maintains routing information 44 that describes the topology of a network, such as SP network 10 from FIG. 1, and, in particular, routes through the network. Routing information 44 may include, for example, route data that describes various routes within the network, and corresponding next hop data indicating appropriate neighboring devices within the network for each of the routes. Router 30 updates routing information 44 to accurately reflect the topology of the network.

Control unit 32 provides an operating environment for protocols 46. Router 30 uses protocols 46 to support hybrid VPLS domains for subscribers, such as subscribers 18 of FIG. 1. More particularly, router 30 uses protocols 46 to support hybrid VPLS domains and hub-and-spoke connectivity across a SP network, such as SP network 10 of FIG. 1. In other cases, protocols 46 may include other L2 network service protocols in addition to or instead of VPLS 46A. Moreover, protocols 46 may include other routing protocols in addition to or instead of Border Gateway Protocol (BGP) 46B, such as the Multi-protocol Label Switching (MPLS) protocol, the label distribution protocol (LDP), interior and exterior routing protocols, or other network protocols.

Control unit 32 further maintains upstream forwarding information 48A and downstream forwarding information 48B ("forwarding information 48"). Forwarding information 48 associates network destinations with specific next hops and corresponding interface ports. In general, when router 30 receives a multicast packet via one of inbound links 36, control unit 32 determines a destination and associated next hop for the packet in accordance with routing information 44 and forwards the packet on one of outbound links 38 to the corresponding next hop in accordance with forwarding information 48 based on the destination of the packet. In particular, router 30 uses upstream forwarding information 48A to forward packets upstream using P2P forwarding semantics, and uses downstream forwarding information 48B to forward packets downstream using P2MP forwarding semantics. Router 30 maintains both upstream forwarding information 48A and downstream forwarding information 48B because router 30 may function as a source device in one hybrid VPLS domain and as a destination device in another hybrid VPLS domain.

In order to support P2MP forwarding semantics in the downstream direction, router 30 exchanges hybrid VPLS domain information with the other PE routers included within the hybrid VPLS. Router 30 stores remote MAC addresses received in communications from other PE routers in remote address table 52. In accordance with the flooding and learning procedures of VPLS protocol 46A, router 30 also learns remote MAC addresses when receiving packets from downstream PE routers. Router 30 saves learned MAC addresses in address learning table 54. The MAC addresses stored in address learning table 54 may then be included in remote address table 52. Downstream forwarding information 48B may therefore include a full set of MAC tables learned using VPLS 46B. Router 30 may then forward packets to downstream routers within the hybrid VPLS domain based on VPLS forwarding semantics.

In contrast, in order to support P2P forwarding semantics in the upstream direction, router 30 need not perform any learning procedures. Upstream forwarding information 48A may include local address table 50, which includes MAC addresses recorded from communications with local devices. Upstream forwarding information 48A does not include a full set of network address information. Instead, upstream forwarding information 48A only includes information needed to forward packets in a P2P manner to locally connected devices, such as subscriber devices. Router 30 may forward packets to an upstream router within the hybrid VPLS domain by blindly following P2P pseudo-wires between router 30 and the upstream router.

Although shown for purposes of illustration as separate data structures, forwarding information 48 may be contained in a single data structure. Forwarding information 48 and routing information 44 may be maintained in the form of one or more tables, databases, link lists, radix trees, databases, flat files, or any other data structures.

Once the hybrid VPLS domain is established, router 30 may receive L2 data, such as Ethernet packets, from the upstream direction via an upstream interface. When L2 data is received on an upstream interface, router 30 forwards the data using P2MP forwarding semantics. In particular, control unit 32 processes the received L2 data in accordance with VPLS 46A, and accesses downstream forwarding information 48B in order to properly emulate L2 communication through intermediate networks. Control unit 32 looks up the MAC address of the received data packets in remote address table 52, and determines whether the destination is known. Based on this determination, control unit 32 selects one or more pseudo-wires to forward the received L2 data toward the destination devices based on a destination route target within downstream forwarding information 48B. Router 30 then forwards the packets to the downstream device by accessing routing information 44 and determining one or more next-hops. Control unit 32 encodes the L2 data in accordance with routing protocol 46B (e.g., MPLS) and transmits the encoded L2 data along the selected one or more LSPs. In this manner, router 30 provides P2MP VPLS forwarding in the downstream direction.

When router 30 receives data from the downstream direction on a downstream interface, e.g., a request for an IPTV channel, router 30 forwards the data in accordance with P2P forwarding semantics. In particular, control unit 32 accesses upstream forwarding information 48A to determine where to forward the information based on the port or VLAN on which the data was received. For example, control unit 32 may forward the information based on VLAN tags contained in received packets. Control unit 32 selects the pseudo-wire to forward the data toward the source router within the hybrid VPLS domain based on a source route target within upstream forwarding information 48A. The data blindly follows the pseudo-wire signaled between router 30 and the source router. In this manner, router 30 provides P2P forwarding in the upstream direction.

When router 30 is solely a destination device for the hybrid VPLS domains to which is belongs, and is not a source device or intermediate device, router 30 may not need to maintain downstream forwarding information 48B, since router 30 would not be forwarding traffic in a downstream direction within the SP network. Similarly, when router 30 is solely a source device for the hybrid VPLS domains to which it belongs, and is not a downstream or intermediate device, router 30 may not need to maintain upstream forwarding information 48A, since router 30 has no need to forward traffic in an upstream direction within the SP network.

The architecture of router 30 illustrated in FIG. 3 is shown for exemplary purposes only. The invention is not limited to this architecture. In other embodiments, router 30 may be configured in a variety of ways. In one embodiment, for example, some of the functionally of control unit 32 may be distributed within IFCs 34. In a further embodiment, control unit 32 may include a routing engine that performs routing functions and maintains a routing information base (RIB), e.g., routing information 44, and a forwarding engine that performs packet forwarding based on a forwarding information base (FIB), e.g., forwarding information 48, generated in accordance with the RIB. Moreover, although described with respect to router 30, the bi-directional forwarding techniques described herein may be applied to other types of network devices, such as gateways, switches, servers, workstations, or other network devices. For example, network switches 16B may be configured to implement the bi-directional forwarding techniques.

Control unit 32 may be implemented solely in software, or hardware, or may be implemented as a combination of software, hardware, or firmware. For example, control unit 32 may include one or more processors which execute software instructions. In that case, the various software modules of control unit 32 may comprise executable instructions stored on a computer-readable medium, such as computer memory or hard disk.

Figure 4:
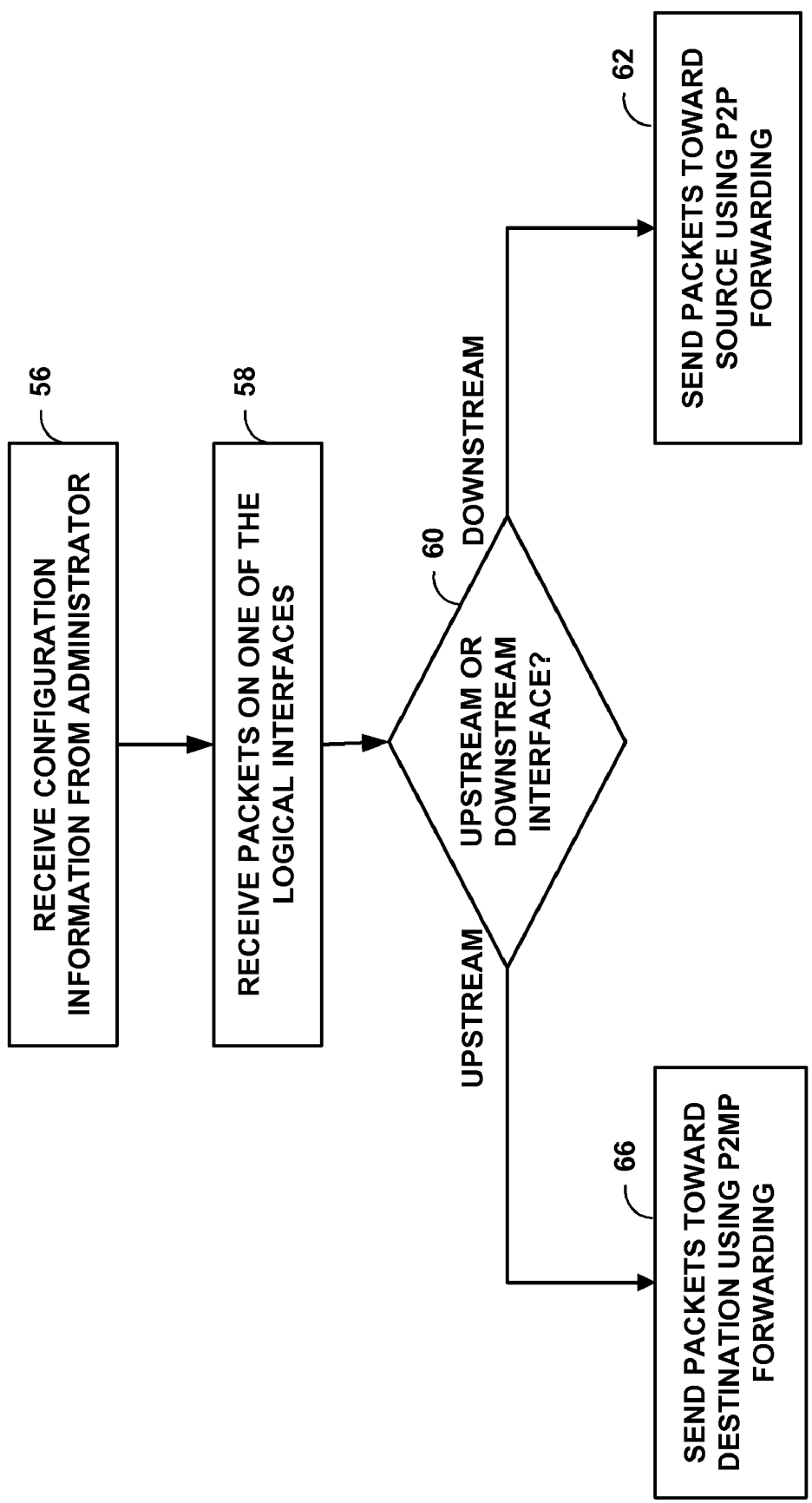
FIG. 4 is a flowchart illustrating example operation of a router in supporting hybrid VPLS domains in accordance with the principles of the invention.

FIG. 4 is a flowchart illustrating example operation of a router, such as one of PE routers 12 from FIG. 1 or router 30 from FIG. 3, supporting hybrid VPLS domains in accordance with the principles of the invention. FIG. 4 will be described with respect to router 30 from FIG. 3. Router 30 may receive configuration information from an administrator (56). For example, the administrator may configure router 30 to belong to one or more hybrid VPLS domains. The administrator may also configure a set of logical interfaces as "upstream interfaces," i.e., interfaces on which traffic is received from the upstream direction, and another set of logical interfaces as "downstream interfaces," i.e., interfaces on which traffic is received from the downstream direction. The administrator may associate the set of upstream interfaces with P2MP forwarding semantics, and the set of downstream interfaces with P2P forwarding semantics.

Router 30 receives data packets from neighboring devices within a hybrid VPLS to which router 30 belongs (58). Router 30 determines whether the packets were received on an upstream interface or a downstream interface (60). For example, router 30 may receive packets on a downstream interface from one or more a downstream routers, such as a request from a subscriber, e.g., one of subscribers 18 from FIG. 1, for an IPTV channel. As another example, router 30 may receive packets on an upstream interface from an upstream router, such as IPTV content from a source, such as source network 14 from FIG. 1.

When the packets are received on a downstream interface, router 30 sends the packets toward a source router using P2P forwarding semantics, e.g., VLAN forwarding semantics (62). Router 30 looks at the port on which the packets were received and upstream forwarding information 48A, and selects the pseudo-wire signaled between router 30 and an upstream router within the hybrid VPLS domain based on a source route target within upstream forwarding information 48A. The packets may blindly follow the selected pseudo-wire in a P2P manner. Therefore, router 30 need not look at the MAC addresses of the packets when forwarding in the upstream direction.

When the packets are received on an upstream interface, router 30 sends the packets toward a destination router using P2MP forwarding semantics, e.g., VPLS forwarding semantics (66). Router 30 looks up the MAC address of a received packet in downstream forwarding information 48B to determine whether router 30 knows the destination of the packet. If router 30 knows the destination, router 30 selects the corresponding pseudo-wire signaled between router 30 and the downstream device within the hybrid VPLS domain based on a destination route target within downstream forwarding information 48B. Router 30 then forwards the packets to the downstream device according to routing information 44. If router 30 does not know the destination, router 30 may flood the packets to every downstream device within the hybrid VPLS domain.

In this manner, the techniques described herein provide hybrid forwarding within a VPLS domain established over a SP network. The hybrid VPLS techniques enable a PE router to forward packets going upstream, i.e., toward a source, in a P2P manner, and forward packets going downstream, i.e., toward a destination, in a P2MP manner. In this manner, the hybrid VPLS techniques provide security by preventing destination devices from communicating with other destination devices within the same hybrid VPLS domain, while allowing a source device within the hybrid VPLS domain to communicate with any of the destination devices. Although described for exemplary purposes in reference to VPLS, the techniques may readily be applied to other Ethernet-based service domains.

Various embodiments of the invention have been described. These and other embodiments are within the scope of the following claims.

The invention claimed is:

1. A method comprising:
   establishing an Ethernet-based service domain over a network to transport layer two (L2) communications between an upstream gateway network device of the Ethernet-based service domain and one or more downstream network devices of the Ethernet-based service domain;
   receiving configuration information configuring a first set of interfaces of a network device as downstream interfaces for receiving packets from downstream network devices;
   receiving configuration information configuring a second set of interfaces of the network device as upstream interfaces for receiving packets from upstream network devices;
   forwarding packets received with the network device from the upstream gateway network device on the upstream interfaces to the one or more downstream network devices of the Ethernet-based service domain in a point-to-multipoint (P2MP) manner by using Media Access Control (MAC) addresses of the packets to determine the one or more downstream network devices to which to forward the packets; and
   forwarding all packets received with the network device from one of the downstream network devices on one of the downstream interfaces to the upstream gateway network device in a point-to-point (P2P) manner by outputting each of the packets on a P2P connection selected based on a Virtual Local Area Network (VLAN) identifier contained in the received packets without considering a MAC address of the packets, wherein the network device and the upstream gateway network device are endpoints of the P2P connection.

2. The method of claim 1, wherein the Ethernet-based service domain comprises a virtual private local area network service (VPLS) domain established over the network.

3. The method of claim 1, further comprising maintaining upstream forwarding information within the network device that includes a local address table.

4. The method of claim 1, further comprising maintaining downstream forwarding information within the network device that includes a remote address table and an address learning table.

5. The method of claim 1, wherein forwarding packets in the P2MP manner comprises forwarding packets from the network device using virtual private local area network service (VPLS) forwarding.

6. The method of claim 1, further comprising establishing a connection between the network device and the upstream gateway network device, wherein forwarding packets in the P2P manner comprises forwarding the packets along the connection from the network device to the upstream gateway network device.

7. The method of claim 6, wherein establishing the connection comprises signaling a P2P pseudo-wire between the network device and the upstream gateway network device.

8. The method of claim 1, further comprising establishing connections between the network device and each of the one or more downstream network devices, wherein forwarding packets in the P2MP manner comprises determining the MAC addresses of the one or more downstream devices and forwarding the packets along the connections based on the MAC addresses.

9. The method of claim 1, further comprising receiving packets from the one or more downstream network devices on the set of downstream interfaces for the network device.

10. The method of claim 9, wherein forwarding packets in the P2P manner comprises accessing upstream forwarding information maintained in the network device to determine a destination of the packets received on the set of downstream interfaces.

11. The method of claim 10, wherein forwarding packets in the P2P manner comprises selecting a connection on which to send the packets based on a source route target of the Ethernet-based service domain included within the upstream forwarding information.

12. The method of claim 1, further comprising receiving packets from the upstream gateway network device on the set of upstream interfaces for the network device.

13. The method of claim 12, wherein forwarding packets in the P2MP manner comprises accessing downstream forwarding information maintained in the network device to determine a destination of the packets received on the set of upstream interfaces.

14. The method of claim 13, wherein forwarding packets in the P2MP manner comprises selecting one or more connections on which to send the packets based on the MAC addresses of the received packets and a destination route target of the Ethernet-based service domain included within the downstream forwarding information.

15. The method of claim 1, wherein the upstream gateway network device comprises a Broadband Remote Access Server (BRAS).

16. The method of claim 1, wherein the downstream network devices comprise switches connected to subscriber devices.

17. A network device of an Ethernet-based service domain established over a network comprising:
 a control unit adapted to transport layer two (L2) communications between an upstream gateway network device of the Ethernet-based service domain and one or more downstream network devices of the Ethernet-based service domain;
 wherein the control unit is adapted to forward packets received from the upstream gateway network device on a first set of interfaces configured as upstream interfaces to the one or more downstream network devices of the Ethernet-based service domain in a point-to-multipoint (P2MP) manner by using Media Access Control (MAC) address of the packets to determine the one or more downstream network devices to which to forward the packets; and
 wherein the control unit is adapted to forward all packets received from downstream network devices on a second set of interfaces configured as downstream interfaces to the upstream gateway network device of the Ethernet-based service domain in a point-to-point (P2P) manner by outputting each of the packets on a P2P connection selected based on a Virtual Local Area Network (VLAN) identifier contained in the received packets without considering a MAC address of the packets, wherein the network device and the upstream gateway network device are endpoints of the P2P connection.

18. The network device of claim 17, wherein the Ethernet-based service domain comprises a virtual private local area network service (VPLS) domain established over the network.

19. The network device of claim 17, wherein the control unit maintains upstream forwarding information that includes a local address table.

20. The network device of claim 17, wherein the control unit maintains downstream forwarding information that includes a remote address table and an address learning table.

21. The network device of claim 17, wherein forwarding packets in the P2MP manner comprises forwarding packets from the network device using virtual private local area network service (VPLS) forwarding.

22. The network device of claim 17, wherein the control unit establishes the P2P connection between the network device and the upstream gateway network device and forwards packets blindly along the connection from the network device to the upstream gateway network device.

23. The network device of claim 22, wherein the control unit signals a P2P pseudo-wire between the network device and the upstream gateway network device.

24. The network device of claim 17, wherein the control unit establishes connections between the network device and each of the one or more downstream network devices, determines the MAC addresses of the one or more downstream devices, and forwards the packets along the connections based on the MAC addresses.

25. The network device of claim 17,
 wherein the first set of interfaces for the network device are configured as downstream interfaces by an administrator; and
 wherein the second set of interfaces for the network device are configured as upstream interfaces by the administrator.

26. The network device of claim 25, wherein the set of downstream interfaces receives packets from the one or more downstream network devices.

27. The network device of claim 26, further comprising upstream forwarding information within the network device, wherein the control unit accesses the upstream forwarding information to determine a destination of the packets received on the set of downstream interfaces and forwards the received packets in the P2P manner.

28. The network device of claim 27, wherein the control unit selects a connection on which to send the received packets based on a source route target of the Ethernet-based service domain included within the upstream forwarding information.

29. The network device of claim 25, wherein the set of upstream interfaces receives packets from the upstream gateway network device.

30. The network device of claim 29, further comprising downstream forwarding information within the network device, wherein the control unit accesses the downstream forwarding information to determine a destination of the packets received on the set of upstream interfaces and forwards the received packets in the P2MP manner.

31. The network device of claim 30, wherein the control unit selects one or more connections on which to send the packets based on addresses of the received packets and a destination route target of the Ethernet-based service domain included within the downstream forwarding information.

32. A non-transitory computer-readable medium encoded with instructions that cause a programmable processor to perform steps when run on a network device of an Ethernet-based service domain established over a network to transport layer 2 (L2) communications between the network device of the Ethernet-based service domain and one or more network devices of the Ethernet-based service domain which are different from the network device, the steps comprising:
 receiving configuration information configuring a first set of interfaces of the network device as downstream interfaces for receiving packets from downstream network devices;
 receiving configuration information configuring a second set of interfaces of the network device as upstream interfaces for receiving packets from an upstream gateway network device;
 forwarding packets received from the upstream gateway network device on the upstream interfaces with the network device of an Ethernet-based service domain to the one or more downstream network devices of the Ethernet-based service domain in a point-to-multipoint (P2MP) manner by using Media Access Control (MAC) addresses of the packets to determine the one or more downstream network devices to which to forward the packets; and
 forwarding all packets received with the network device from one of the downstream network devices on one of the downstream interfaces to the upstream gateway network device in a point-to-point (P2P) manner by outputting each of the packets on a P2P connection selected based on a Virtual Local Area Network (VLAN) identifier contained in the received packets without considering a MAC address of the packets, wherein the network device and the upstream gateway network device are endpoints of the P2P connection.

33. The non-transitory computer-readable medium of claim 32, further comprising instructions that cause the processor to establish the P2P connection between the network device and the upstream gateway network device and forward the packets blindly along the connection from the network device to the upstream gateway network device.

34. The non-transitory computer-readable medium of claim 32, further comprising instructions that cause the processor to establish connections between the network device and each of the one or more downstream network devices, determine the MAC addresses of the one or more downstream devices, and forward the packets along the connections based on the MAC addresses.

35. The non-transitory computer-readable medium of claim 32, further comprising instructions that cause the processor to:

receive packets from the one or more downstream network devices on the set of downstream interfaces for the network device;

access upstream forwarding information maintained in the network device to determine a destination of the packets received on the set of downstream interfaces; and select a connection on which to send the packets based on a source route target of the Ethernet-based service domain included within the upstream forwarding information.

36. The non-transitory computer-readable medium of claim 32, further comprising instructions that cause the processor to:

receive packets from the upstream gateway network device on the set of upstream interfaces for the network device;

access downstream forwarding information maintained in the network device to determine a destination of the packets received on the set of upstream interfaces; and select one or more connections on which to send the packets based on addresses of the received packets and a destination route target of the Ethernet-based service domain included within the downstream forwarding information.

* * * * *